UNITED STATES PATENT OFFICE.

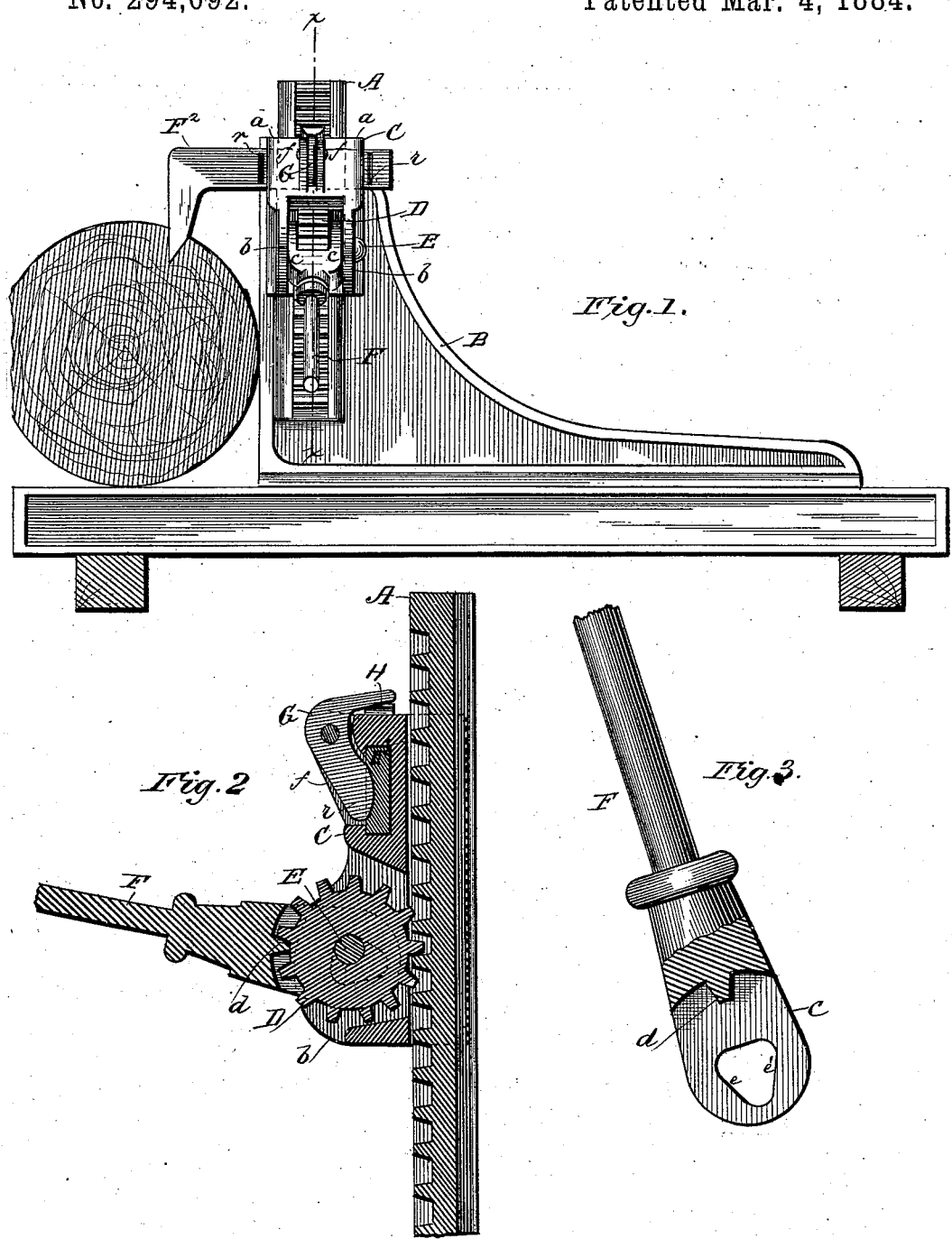

WILLIAM H. SNYDER, OF WAYNESBOROUGH, PENNSYLVANIA.

SAW-MILL DOG.

SPECIFICATION forming part of Letters Patent No. 294,692, dated March 4, 1884.

Application filed January 10, 1884. (No model.)

*To all whom it may concern:*

Be it known that I, WILLIAM H. SNYDER, a citizen of the United States, residing at Waynesborough, in the county of Franklin and State of Pennsylvania, have invented certain new and useful Improvements in Saw-Mill Dogs, of which the following is a description.

Figure 1 is a side elevation of my invention applied to a saw-mill carriage. Fig. 2 is a vertical section through the line $x\ x$ of Fig. 1, and Fig. 3 is a sectional view of the working-lever.

My invention relates to that class of saw-mill dogs in which the dog or tooth is arranged in a sliding head, which is adjusted by means of a pinion or toothed segment over a vertical rack-bar affixed to the side of the knee of the log-carriage.

My invention consists in combining with said sliding head, pinion, and rack-bar a lever having a loose play about the axis of the pinion, with peculiar bearings for the same, and a tooth adapted to enter and remain in the notches of the pinion, to turn it when the lever has one of its bearing-surfaces on the axis of the pinion, and which lever and tooth are adapted to move out of range of the pinion to turn back over the same when the lever is adjusted away from the axis of the pinion.

It also consists in peculiar means for locking the dog to the sliding head, as hereinafter described.

In the drawings, A represents a toothed rack-bar, fastened to or formed with the knee B of the log-carriage, which said rack-bar occupies a vertical position on the side of said knee. Upon this rack-bar there slides vertically the head-block C, which has lips or flanges $a\ a$, that embrace the sides of the rack-bar to prevent the head from becoming detached therefrom. This head-block has a recess in the lower part of the same opening through to the rack-bar, in which is placed a pinion, D, which revolves upon an axial bolt, E, passing through ears $b\ b$ at the lower sides of the head-block. This pinion does not fill the space between the ears $b\ b$; but there is sufficient distance between the pinion and the ear on each side to receive on the opposite sides of the pinion and between the latter and the ears the two branched ends $c\ c$ of the handle-lever F.

Formed with the head of the lever, and extending straight across from one of the branches $c$ of the lever to the other, is a tooth or projection, $d$, which is adapted to enter the notches between the teeth of the pinion, to cause the lever to be rigidly connected to the pinion in turning the same. The two branches $c\ c$ of the lever have a peculiar-shaped hole through them, which receives the axial bolt, and the sides of which hole form a bearing against the said bolt. This hole diverges from the inner end of the lever toward the outer end, forming an elongated hole with two sides, $e\ e'$, inclined in opposite direction to the central longitudinal line of the lever. Now, to work the head-block up or down on the rack, the lever is forced inwardly until its tooth $d$ enters one of the notches of the pinion. Then, as the lever is turned up or down, one or the other of the inclined faces $e$ or $e'$ bears against the axial bolt of the pinion, and said incline serves, when the strain is applied, to draw the lever and its tooth into the pinion, holding the tooth firmly engaged to the pinion while turning the same, no matter whether the pinion is being turned up or down to raise or lower the head-block.

$F^2$ is the dog, which is in the nature of a horizontal bar, having a tooth depending at right angles, and adapted to enter the log of wood. The shank or bar of this dog passes through a transverse opening in the head-block, and has on its side a number of indentations or recesses, $r$. The tooth of this dog may be projected farther from or closer to the head-block, according to the size of the log; and to hold it in its various adjustments I provide a locking-latch, G, which is pivoted between ears $f\ f$ on the face of the head-block, between which ears there is an opening passing through to the socket in which slides the shank or bar of the dog. The latch G is of a right-angular shape, one portion of which is approximately parallel with the face of the head-block, and extends down through the hole between the ears $f$ to engagement with the notches of the dog, and the other portion of which extends up over the end of the head-block in position approximately parallel thereto. Between this upper end of the head-block and the latch there is a spring, H, whose tension serves to hold the upper end of the latch up and throw the lower end into engagement with the notches of the dog-bar.

I am aware that it is not new to provide devices for locking the dog-bar in its adjustment through the head-block; but my peculiar construction of these parts is simple, unobtrusive, conveniently accessible, and easily worked.

In making use of my devices the dog-bar is adjusted so that its tooth is in the right position to penetrate the log. The lever is then pulled out and the head-block, and dog are allowed to fall and the tooth to bury in the log, partially. The lever is then raised and its tooth d entered between the teeth of the pinion, and the lever then brought down, which rotates the pinion and moves the head-block and dog still farther down, which firmly embeds the tooth in the log and holds the latter tightly while being sawed.

Having thus described my invention, what I claim as new is—

1. The combination, with the head-block, the loose pinion, the axial bolt securing the latter to the head-block, and the rack-bar, of the handle-lever having branched ends c c, with elongated openings in them, with independent bearings e e', and a tooth, d, as and for the purpose described.

2. The head-block C, having a hole through it for the dog, and another hole in its face communicating with the hole for the dog, and provided with ears f f, rising from the edges of the hole in the face, in combination with the right-angular latch G, pivoted to the ears f f, and having one end extending through the hole in the face to engage with the dog, and its other end lapping over the top of the head-block, and a spring, H, located between the top of the head-block and the upper arm of the latch, as and for the purpose described.

WILLIAM H. SNYDER.

Witnesses:
D. M. GOOD, Jr.,
M. D. GOOD.